Feb. 6, 1940.  P. McSHANE  2,189,591
SHUNT TRIP OVERLOAD PROTECTIVE SYSTEM
Filed Dec. 17, 1936    2 Sheets-Sheet 1

WITNESSES:
C. J. Weller.

INVENTOR
Phelan McShane.
BY
Paul E. Friedemann
ATTORNEY

Feb. 6, 1940. P. McSHANE 2,189,591
SHUNT TRIP OVERLOAD PROTECTIVE SYSTEM
Filed Dec. 17, 1936  2 Sheets-Sheet 2

WITNESSES:
C. J. Weller
Wm. E. Groome

INVENTOR
Phelan McShane.
BY
Paul E. Friedemann
ATTORNEY

Patented Feb. 6, 1940

2,189,591

UNITED STATES PATENT OFFICE 2,189,591

SHUNT TRIP OVERLOAD PROTECTIVE SYSTEM

Phelan McShane, Pittsburgh, Pa., assignor to Westinghouse Electric & Manufacturing Company, East Pittsburgh, Pa., a corporation of Pennsylvania Application December 17, 1936, Serial No. 116,377

5 Claims. (Cl. 175—294)

My invention relates to a control system for energy consuming devices, and more particularly to a control system by means of which energy consuming devices are started and stopped as a function of the supplying capacity of a source of energy and are stopped so as not to restart when the amount of energy taken by an energy consuming device exceeds a given value.

Still more specifically, my invention relates to electric control systems for current consuming devices, as for instance motors, which devices, after being set in operation, stop automatically upon a failure of voltage and restart automatically upon a return of voltage but will not restart automatically once the device, or devices, have been stopped by reason of an overload.

One object of my invention is to provide respectively for automatic stopping and automatic restarting of an energy consuming device with a decrease of the supplying capacity of a source of energy and an increase of the supplying capacity of a source of energy, and for automatically stopping and preventing automatic restarting of an energy consuming device when the flow of energy to such device is above a given value.

Another object of my invention is to provide for automatic stopping and restarting respectively of a current consuming device with decreases and increases of the voltage of a source of electric energy, and for stopping and preventing the restarting of such current consuming device when the current value of such device is above a given value.

A broad object of my invention is to provide an overload protective scheme for a current consuming device that is independent of voltage failures of the source of electric energy for the current consuming device.

A more specific object of my invention is to provide an electric system of control for a current consuming device wherein a starting switch normally free to move back and forth from a closed position to an open position and from an open position to a closed position is biased to an open position after the occurrence of an overload.

Other objects and advantages will become more apparent from a study of the following specification when taken in conjunction with the accompanying drawings, in which.

While my system of control has general application, in the subject matter following, other than some of the claims hereto appended, I shall confine the disclosure to my system of control as applied to electric motors for driving some useful load, as, for instance, pumps, fans, beacons, etc.

For some applications such as ventilating fans, sump pumps, airplane beacons, lighthouses, etc., it is sometimes very desirable that the motor, after having stopped by reason of a voltage failure, automatically restart, that is, resume operation when the voltage comes back on the supply buses, but it is not desirable that the motor even attempt to start if the supply circuit for the motor is interrupted by reason of the operation of the overload protective devices associated with the motor and controller.

It is possible to obtain this desired result to a limited extent by the use of an overload responsive device so arranged that its switching elements are restrained to the open position when such device acts by reason of an overload. Such a device requires a manual or magnetic reset.

In some cases, it is impractical or at least undesirable to employ a device, as a relay, that must be reset manually or magnetically. Oil immersed starters and circuit breakers may be cited as examples.

The usual overload relay is so constructed that its contacts are caused to separate when the relay acts. With my invention I use an overload relay such as the relays shown in Figs. 1, 2 and 3, respectively, having normally open contacts but which will close to establish a circuit when an overload occurs. The closing of the switching elements, or contacts, of the overload relay establishes a circuit to the operating coil of a device so designed and so arranged that the energization of the coil will cause a latch or other mechanical means, or even electrical means, to be released. The releasing of such latch will permit the contacts of a switch, constituting part of the starting control and which have been restrained to a closed position by the latch, to separate. Separation of such contacts will either directly open the circuit of a current consuming device, as a motor, or will cause the deenergization of the operating coil for a circuit interrupting device, for the current consuming device, to be deenergized to thus interrupt the circuit for the current consuming device.

A still better understanding of my invention can, no doubt, be secured from a study of a detailed sequence of operation of my invention when considered in conjunction with each figure.

Figure 1:
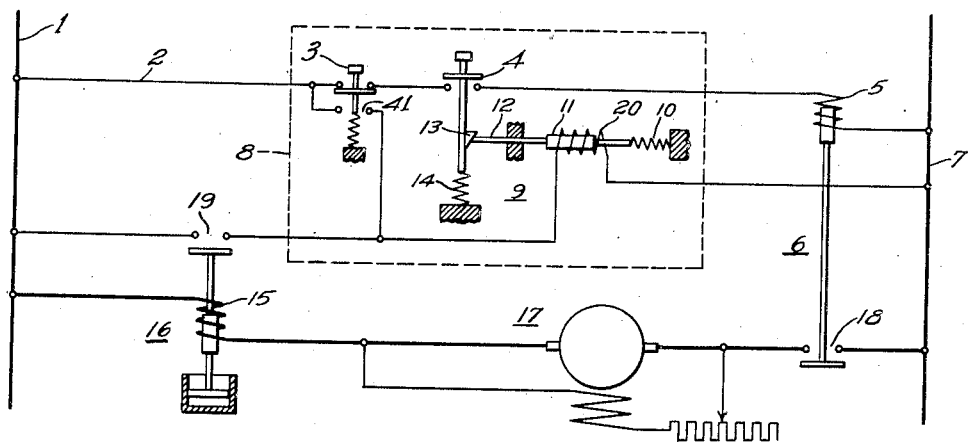
Figure 1 is a diagrammative showing of my invention as applied to an energy consuming device requiring direct current electrical energy.

If the motor, referring to Fig. 1, is to be controlled with my system of control, and assuming that the buses 1 and 7 are properly connected to a suitable generator so that the buses can be considered a source of electrical energy, the operation is as follows:

The attendant, from the control panel or some other selected point remote from the location of the motor or controller to be operated, operates the starting switch or push button 4, whereupon a circuit is established from bus 1 through the conductor 2, stop switch 3, starting switch 4 and actuating coil 5 of the circuit breaker 6, to the bus 7. Mounted in the casing of the start and stop control 8 is an electromagnetically controlled latching device 9. This latching device 9 is biased toward the left by the compression spring 10 acting on the magnetic armature 11 of the latching device 9. The left hand end of the armature 11 is provided with a stem 12 adapted to coact with the lug 13 on the stem of the starting switch 4 to thus hold the starting switch 4 closed after it is actuated to a closed position against the action of spring 14 biasing the starting switch to an open circuit position. From this description, it is clear that switch 4, once actuated, will remain closed unless released by the latching device 9.

Energization of coil 5 of the circuit breaker or line switch 6 causes the operation of this switch to thus establish an energizing circuit for the motor. The energizing circuit for the motor may be traced from the bus 1 through the actuating coil 15 of the overload responsive device 16, the field windings and armature windings of motor 17, the contact members 18 of the line contactor 6 to the bus 7.

The overload responsive device is provided with time-delay means to prevent operation of this device 16 during the starting of the motor 17.

In the installations in which my system of control is especially useful, it is desired that the motor run all the time, that is, normally the service it renders is not to be interrupted. It is, however, desirable that the motor do not restart once having been subjected to an excessive overload. In mines short-circuits are frequent and the motor operating, for instance, a sump pump at some remote low level of the mine is thus not to restart until the fault has been removed. Voltage failures are also frequent in such fields of use but it is very desirable that such voltage failures to not permanently affect the operation of the motors. My device, considering the whole system, is selective, operating on overload in one manner and on voltage failure in another manner.

In mines it may even be desirable that all the pump motors temporarily stop when other apparatus for instance production apparatus, as hoists, is taking a heavy load from the line. The voltage drop on the lines will thus be kept within desired limits and the power demand curve will not be so jagged but conform more nearly to some desired average.

To accomplish these desired results, the respective line switches, as 6 shown in Fig. 1, for the motors are adjusted to become sufficiently deenergized by a predetermined drop in the line voltage to move to open circuit position to thus stop the motors and as the voltage on the line increases the respective starting contactors or line switches operate to restart the motors.

For instance in Fig. 1, a predetermined drop in voltage or voltage failure on the buses 1 and 7 causes coil 5 to become sufficiently deenergized to break the circuit for motor 17 at the contact members 18. The motor 17 thus stops. As the voltage on buses 1 and 7 returns or rises above a predetermined value, contact members 18 are again closed by the actuation of coil 5 and the motor restarts.

If an overload occurs on motor 17, overload responsive device 16 is operated after a short, but adjustable, interval of time and contact members 19 are closed. Closure of contact members 19 establishes a circuit from bus 1 through contact members 19 and actuating coil 20 of the latching device 9, to the bus 7. The coil 20 actuates the armature 11 toward the right against the bias of spring 10 with the result that switch 4 is released and is moved to the position shown in Fig. 1 by spring 14. After switch 4 is thus opened the motor is stopped by reason of the deenergization of coil 5 and the consequent opening of contact members 18. The motor, therefore, does not restart automatically. After removal of the fault, the motor may, of course, be started through operation of switch 4.

Figure 2:
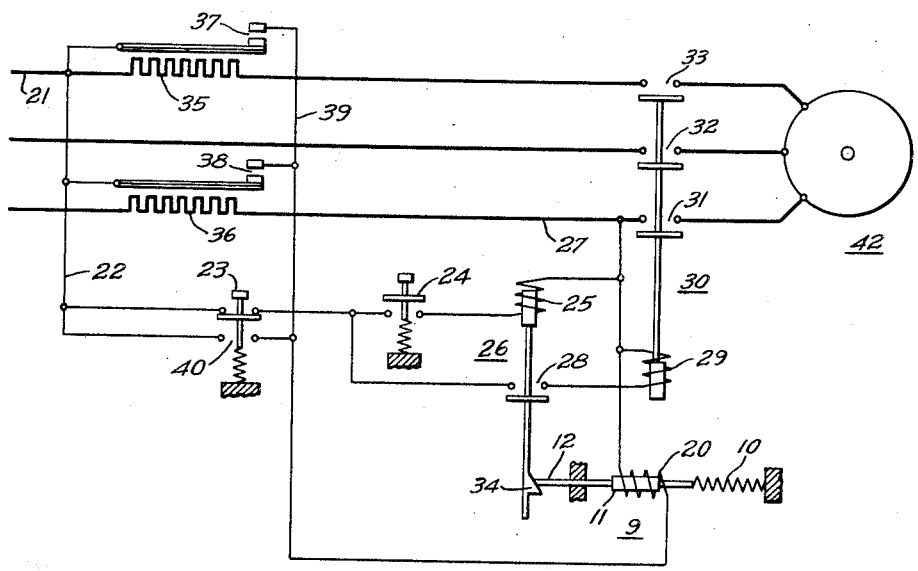
Fig. 2 is a diagrammatic showing of a modification of my invention as applied to an energy consuming device requiring alternating current electrical energy.

In the modification shown in Fig. 2, the number of units or pieces of electrical apparatus used is somewhat different and the starting switch or push button may be located at a point remote from the latching mechanism 9 and the relay 26 controlled thereby. In practice, the equipment shown in Fig. 2 may probably be somewhat more expensive, but the advantage may be obtained of locating the starting switch 24 remote from the remaining portion of the control apparatus.

To start the motor shown in Fig. 2, the attendant may actuate the push button switch 24 whereby a circuit is established from conductor or bus 21 through conductor 22, stop push button switch 23, starting push button switch 24 and the actuating coil 25 of the relay 26 to the bus or conductor 27. Operation of the relay 26 establishes a circuit from the bus 21 through conductor 22, stop push button switch 23, through the contact members 28 and the actuating coil 29 of the line switch 30 to the bus 27. Energization of the coil 29 causes the operation of the line switch 30 to thus close the contact members 31, 32 and 33 whereupon the motor is started.

Operation of the relay 26 also causes the movement of the detent or lug 34 to a position such that the stem 12 of the latching device 9 locks the relay 26 into circuit closing position. The latching device 9, so far as the showing in Fig. 2 is concerned, is the same as that shown in Fig. 1 and need, therefore, not be again explained.

With this arrangement, the motor 42 operates as long as the voltage across buses 21 and 27 is above a predetermined value to maintain the actuating coil 29 energized. A voltage failure or a drop in voltage below a selected value will cause the opening of the contact members 31, 32 and 33 and as soon as the voltage across buses 21 and 27 rises above a given value, the motor is restarted by the closing of contact members 31, 32 and 33. It is thus apparent that a decrease in voltage on the buses stops the motor 42 whereas a rise in voltage on buses 21 and 27 restarts the motor.

In the event of an overload, the thermostatic overload devices showing the heaters 35 and 36 adjacent a pair of thermostatic elements will cause the closing of either or both of the contact members 37 and 38 whereupon a circuit is established for coil 20 from the bus 21 through either or both of the contact members 37 and 38, conductor 39 and coil 20 to the bus 27. The relay 26 is thus released and contact members 28 are opened.

Coil 29 is thus energized causing the opening of contact members 31, 32 and 33 to stop the motor with the result that motor 42 will not restart except through a positive actuation of the push button switch 24 which will, of course, only be done when the cause for the overload has been removed.

To stop the motors shown in Figs. 1 and 2 at will, it is merely necessary to actuate the stop switches shown. For instance, in Fig. 1, actuation of the stop switch 3 establishes a shunting circuit around the contact members 19 by the closure of contact members 41 which will thus stop the motor exactly in the manner it is stopped in the event of an overload. Similarly, in Fig. 2, operation of the push button switch 23 causes the closing of contact members 40 which are connected in shunt relation to the contact members 37 and 38 to thus stop the motor 42 exactly in the manner it is otherwise stopped by the occurrence of an overload.

Figure 3:
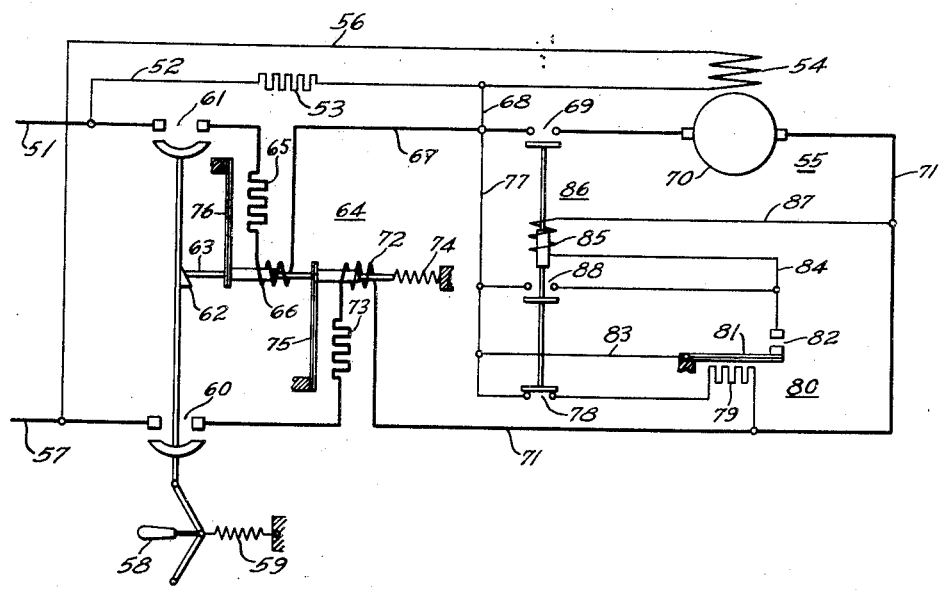
Fig. 3 is a diagrammatic showing of a still further modification of my invention.

The modification shown in Fig. 3 shows my invention used in conjunction with a manually operable circuit breaker. In this modification, if it be assumed that buses 51 and 57 are suitably energized, a circuit is established from bus 51 through the conductor 52, high resistance resistor 53, the field winding 54 of the motor 55 and the conductor 56 to the bus 57. The high resistance resistor 53 permits a continuous current to flow through field winding 54 of just sufficient magnitude to heat the field windings and thus prevent condensation of moisture or other materials on the field poles.

If the attendant wishes to start the motor 55, he pulls lever 58 toward the left against the bias of spring 59 of the manually operable circuit breaker to thus close the contact members 60 and 61. Operation of the manually operable circuit breaker causes the projection 63 on the armatures of the overload device 64 to engage the dog or latching structure 62 to thus maintain the circuit breaker closed. Closure of the contact members 60 and 61 establishes several circuits, one circuit being the circuit from the bus 51 through contact members 61, heating element 65 of the overload device 64, actuating coil 66 of the overload device 64, conductors 67 and 68, the field winding 54 and conductor 56 to the bus 57 and a second circuit being the circuit from the energized conductor 67 through conductor 77, back contact members 78 of the line switch 86 through the heating element 79 of the thermostatic device 80 to conductor 71, actuating coil 72 and heating element 73 of the overload device 64 and contact members 60 to the bus 57.

The closure of the contact members 61, of course, establishes a low resistance shunt for the high resistance resistor 53 to thus cause the field winding 54 to be heavily energized before the armature circuit for the motor is made. The thermostatic device 80 is of such a design that its contact members 82 are not closed until after the field winding 54 has built up to its full strength. However, after such full energization of the field winding has taken place, the heating element 79 will have heated the bimetallic element 81 by an amount sufficient to close the contact members 82 whereupon a circuit is established from the energized conductor 77 through conductor 83 bimetallic member 81, the contact members 82, conductor 84, actuating coil 85 of the line switch 86, and conductor 87 to the energized conductor 71. Energization of the actuating coil 85 causes the operation of the line switch 86 whereupon the circuit for the heating element 79 is interrupted at the back contact members 78 and a holding circuit is established for the actuating coil 85 by the closure of the contact members 88, which holding circuit thereafter is independent of the position of bimetallic element 81. The operation of the line contactor 86 also causes the closing of contact members 69 to thus establish an energizing circuit for the armature 70 of the motor 55, which circuit may be traced from the bus 51 through contact members 61, heating element 65 and actuating coil 66 of the overload device 64, conductor 67, contact members 69, armature 70 of the motor 55, conductor 71, actuating coil 72 and heating element 73 of the overload device 64 and contact members 60 to the bus 57. The spring 74 biases the stem 63 to such a position to hold the circuit breaker closed once it has been operated to a closed position. However, in the event of an overload, the heating elements 73 and 65 cause the bimetallic elements 75 and 76 to deflect toward the right against the bias of spring 74 to thus release the dog 62 by reason of the movement of the projection 63 toward the right. The spring 59 of the circuit breaker thus causes the opening of all the circuits of the system of control except the circuit through the field winding through the high resistance resistor.

It will be noted that the advantages secured by the modification shown in Figs. 1 and 2 are also secured with this modification because the manually operable circuit breaker will only be released in the event of an overload but will be unaffected by voltage failure whereas the line contactor 86 will operate in response to a voltage failure and will be reenergized as soon as voltage comes back on the line. However, it will not be reenergized if its deenergization was caused by reason of an overload.

I am, of course, aware that others skilled in the art, particularly after having had the benefit of the teachings of my invention, might devise other circuit diagrams for accomplishing the novel results I accomplish with my control systems, and I, therefore, do not wish to be limited to the specific showings I have made and the descriptions hereinbefore given, but wish to be limited only by the scope of the appended claims and such prior art as may be pertinent.

I claim as my invention:

1. In a system of control for a current consuming device, in combination, a source of electric energy, a current consuming device, electromagnetic switching means responsive to a predetermined voltage of said source of electric energy adapted to automatically connect said current consuming device to said source of electric energy, and responsive to a voltage lower by a given value than said predetermined voltage, adapted to automatically disconnect said current consuming device from said source of energy, control switching means, normally biased by a spring to open circuit position, but adapted to be operated to closed circuit position to thus establish an energizing circuit for said electromagnetic switching means, the circuit for the electromagnetic switching means through said control switching means being directly connected across the line terminals of said source, electromagnetically releasable latching means, normally adapted to hold said control switching means against the compression of said spring, after operation thereof, in circuit closing position, and means responsive to a predetermined overload current of said current consuming device adapted to energize said latching means to effect the release of said control switching means by said spring, the subsequent restoration of said predetermined overload current to its normal value being effective to completely deenergize all of the elements of the control system.

2. In a system of control for a current consuming device, in combination, a source of electric energy, a current consuming device, electromagnetic switching means responsive to a predetermined voltage of said source of electric energy adapted to automatically connect said current consuming device to said source of electric energy, and responsive to a voltage lower by a given value than said predetermined voltage, adapted to automatically disconnect said current consuming device from said source of energy, control switching means, normally biased by a spring to open circuit position, but adapted to be operated to closed circuit position to thus establish an energizing circuit for said electromagnetic switching means, the circuit for the electromagnetic switching means through said control switching means being directly connected across the line terminals of said source, electric latching means adapted when not energized to a given extent to hold said control switching means in circuit closing position, and means responsive to a given overload current in the current consuming device adapted to energize said electric latching means to thus effect the release of said control switching means, whereby the energizing circuit for said current consuming device is permanently opened, the subsequent restoration of said predetermined overload current to its normal value being effective to completely deenergize all of the elements of the control system.

3. In a system of control for a current consuming device, in combination, a source of electric energy, a current consuming device, electromagnetic switching means responsive to a predetermined voltage of said source of electric energy adapted to automatically connect said current consuming device to said source of electric energy, and responsive to a voltage lower by a given value than said predetermined voltage, adapted to automatically disconnect said current consuming device from said source of energy, control switching means, normally biased by a spring to open circuit position, but adapted to be operated to closed circuit position to thus establish an energizing circuit for said electromagnetic switching means, the circuit for the electromagnetic switching means through said control switching means being directly connected across the line terminals of said source, a latch normally biased to hold said control switching means in circuit closing position once said control switching means have been caused to operate to closed circuit position, electric means adapted to operate said latch to release said control switching means, and means responsive to a given abnormal current drawn by the current consuming device adapted to energize said electric means, whereby said current consuming device is permanently disconnected from said source of electric energy, the subsequent restoration of said abnormal current to a normal value being effective to completely deenergize all of the elements of the control system.

4. In a system of control for a current consuming device, in combination, a source of electric energy, a current consuming device, electromagnetic switching means responsive to a predetermined voltage of said source of electric energy adapted to automatically connect said current consuming device to said source of electric energy, and responsive to a voltage lower by a given value than said predetermined voltage, adapted to automatically disconnect said current consuming device from said source of energy, control switching means, normally biased by a spring to open circuit position, but adapted to be operated to closed circuit position to thus establish an energizing circuit for said electromagnetic switching means, electromagnetically releasable latching means, normally adapted to hold said control switching means, the circuit for the electromagnetic switching means through said control switching means being directly connected across the line terminals of said source after operation thereof, in circuit closing position, and time limit means responsive to a given overload of said current consuming device existing for a given time adapted to energize said latching means to effect the release of said control switching means, the subsequent restoration of said overload current to normal value being effective to completely deenergize all the elements of the control system.

5. In a system of control for a current consuming device, in combination, a source of electric energy, a current consuming device, electromagnetic switching means responsive to a predetermined voltage of said source of electric energy adapted to automatically connect said current consuming device to said source of electric energy, and responsive to a voltage lower by a given value than said predetermined voltage, adapted to automatically disconnect said current consuming device from said source of energy, control switching means, normally biased by a spring to open circuit position, but adapted to be operated to closed circuit position to thus establish an energizing circuit for said electromagnetic switching means, the circuit for the electromagnetic switching means through said control switching means being directly connected across the line terminals of said source, electric latching means adapted when not energized to a given extent to hold said control switching means in circuit closing position, and time limit current responsive means, responsive to a given abnormal current in the current consuming device existing for a given time, adapted to energize said electric latching means to thus effect the release of said control switching means, the subsequent restoration of said abnormal current to a normal value being effective to completely deenergize all the elements of the control system.

PHELAN McSHANE.